US012570396B2

(12) United States Patent
Gale et al.

(10) Patent No.: US 12,570,396 B2
(45) Date of Patent: Mar. 10, 2026

(54) AIRCRAFT BRAKING SYSTEM

(71) Applicant: AIRBUS OPERATIONS LIMITED,
Bristol (GB)

(72) Inventors: Julian Gale, Warrington (GB); Ashley Bidmead, Bristol (GB); Andrew Hebborn, Bristol (GB)

(73) Assignee: AIRBUS OPERATIONS LIMITED,
Bristol (GB)

( * ) Notice: Subject to any disclaimer, the term of this patent is extended or adjusted under 35 U.S.C. 154(b) by 125 days.

(21) Appl. No.: 18/172,234

(22) Filed: Feb. 21, 2023

(65) Prior Publication Data

US 2023/0264809 A1 Aug. 24, 2023

(30) Foreign Application Priority Data

Feb. 21, 2022 (GB) ...................................... 2202331

(51) Int. Cl.
B64C 25/42 (2006.01)
B60T 7/04 (2006.01)
B60T 8/17 (2006.01)
B60T 8/58 (2006.01)

(52) U.S. Cl.
CPC .............. B64C 25/426 (2013.01); B60T 7/04 (2013.01); B60T 8/1703 (2013.01); B60T 8/58 (2013.01); B60T 2250/04 (2013.01)

(58) Field of Classification Search
CPC ....... B64C 25/426; B60T 7/04; B60T 8/1703; B60T 8/58; B60T 2250/04
See application file for complete search history.

(56) References Cited

U.S. PATENT DOCUMENTS

| | | | | |
|---|---|---|---|---|
| 2008/0133073 A1* | 6/2008 | Griffith | ................. | B60T 13/746 |
| | | | | 701/9 |
| 2013/0112513 A1* | 5/2013 | Van Deventer | ......... | B60T 13/74 |
| | | | | 188/106 P |
| 2014/0116821 A1 | 5/2014 | Onfroy et al. | | |

(Continued)

FOREIGN PATENT DOCUMENTS

| | | |
|---|---|---|
| EP | 2 069 174 | 6/2009 |
| EP | 3 312 086 A2 | 4/2018 |
| WO | 2008/150313 A2 | 12/2008 |

OTHER PUBLICATIONS

Combined Search and Examination Report for GB2202331.1, dated Aug. 18, 2022, 6 pages.

(Continued)

*Primary Examiner* — Andrew J Cromer
(74) *Attorney, Agent, or Firm* — Nixon & Vanderhye P.C.

(57) ABSTRACT

A method of parking an aircraft is disclosed including flight crew pedal braking to cause a brake force to be applied to the aircraft wheel brakes to slow the aircraft to a stationary state in which it is ready to be parked. Flight crew then activate a parking brake device and then release the pedal braking. An electronic control device, forming part of the aircraft's braking system for example, automatically intervenes, following the manual release of the pedal braking, to cause a brake force to continue to be applied to the wheels. This may be until sufficient brake force is applied, as a result of the activation of the parking brake device, to hold the aircraft in its parked state or may be for a predetermined period of time, say, ten seconds.

20 Claims, 8 Drawing Sheets

(56)         References Cited

U.S. PATENT DOCUMENTS

2015/0127195 A1*   5/2015   Cahill .................... B64C 25/44
                                          701/3
2018/0105260 A1*   4/2018   Cahill ................... B64D 45/00

OTHER PUBLICATIONS

Airbus S.A.S., 2020, "Safe Aircraft Parking", safetyfirst.airbus.com, dated Jan. 2020 [online], Available from <https://safetyfirst.airbus.com/safe-aircraft-parking/> [Accessed Aug. 17, 2022], 10 pages.
Flight Crew Operating Manual Screenshot, 1 page, dated Nov. 9, 2021.
The Extended European Search Report for Application No. EP 23157648.9, six pages, dated Jun. 22, 2023.

* cited by examiner

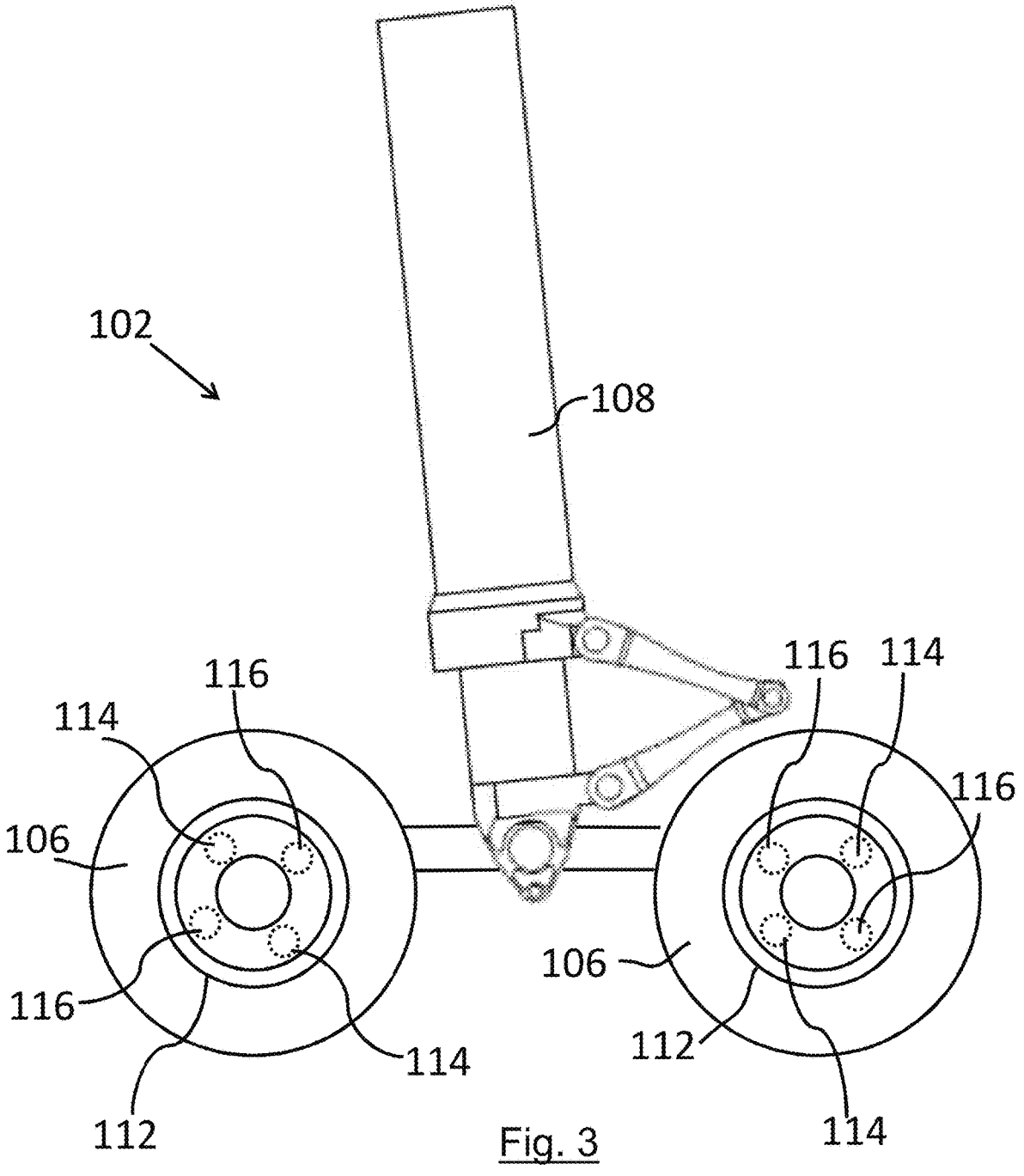
_Fig. 3_

AIRCRAFT BRAKING SYSTEM

CROSS RELATED APPLICATION

This application claims priority to United Kingdom Patent Application GB 2202331.1, filed Feb. 21, 2022, the entire contents of which is hereby incorporated by reference.

BACKGROUND OF THE INVENTION

The present disclosure relates to an aircraft braking system.

The present invention concerns the parking of an aircraft with the use of one or more braking systems on the aircraft. More particularly, but not exclusively, this invention concerns method of operating an aircraft with multiple brake systems and a method of parking an aircraft. The invention also concerns an aircraft with a control device to assist with parking of an aircraft and such a control device, whether or not provided as part of such an aircraft, and other subject matter.

The present invention has particular application in relation to a commercial passenger aircraft, but may also have application in relation to any aircraft that has a braking system that includes multiple brake input devices and/or has multiple independently operable wheel brakes. The braking system of a passenger aircraft normally comprises one or more brakes used during ground manoeuvring operations (e.g. pedal brakes, which may include left and right pedal brakes to operate brake packs on wheels on port and starboard landing gear assemblies) and a brake used to hold the aircraft in position once the aircraft has been parked (e.g. a park brake or "parking brake", which may operate to brake wheels simultaneously on both port and starboard landing gear assemblies). It is common for the pedal brakes, on the one hand, and the park brake, on the other hand, to be at least partially independent of each other. For example, it may be the case that the pedal brakes and the park brake are each set up to actuate separate brake pistons through entirely independent brake systems (in a hydraulic system this would mean there are two or more hydraulic pathways). There are aircraft braking systems which have dual cavity brakes such that the park brake function is provided by one cavity independently of pedal braking which is provided by the other cavity. There are other examples of aircraft braking systems in which the park brake is effected by clamping forces that are provided independently of normal pedal braking. It may be a requirement that the pedal brakes and the park brake are operable independently, so that for example, the park brake can be used in an emergency scenario to bring the aircraft to a stop if the other braking systems have failed.

Pedal brakes and park brakes are manually operated by the flight crew from the cockpit. Pedal braking is used to hold or retard an aircraft whilst it is manoeuvring on the ground. A park brake is used to hold an aircraft in a fixed location on the ground. When the aircraft is being parked, the flight crew will operate the pedal brakes in order to bring the aircraft to a halt in a specified location (for example at a gate at an airport). Once the aircraft has been brought to a standstill, the crew will then set the park brake to an "on" position and release the pedal brake. There is sometimes a delay between the park brake being set to "on" and sufficient force being applied to a brake piston in response. This delay may be due to cold temperatures which may, for certain designs of braking systems, slow down the movement of brake fluid within hydraulic systems. Delays may be caused in other situations based on system design and there may be other causes of faults and/or poor performance in the park brake system, in certain scenarios. It is important that the aircraft does not move unintentionally during the parking procedure, as the aircraft may be in close proximity to buildings and landing crew. The flight crew are expected to hold the aircraft stationary with the use of pedal braking until such time as the aircraft is safely parked and held stationary with the park brake. However, there are instances when the flight crew may prematurely release pedal braking, for example before the park brake force on the park brake piston is sufficient to hold the aircraft reliably in a stationary position. It is also possible that a fault in the park brake system may be detected shortly after the park brake has been set to "on" (but not before then). In such a scenario, the crew may have already released the pedal brake input before they are alerted to the park brake fault. These scenarios might result in the aircraft being without sufficient brake force on the brake pistons when it is stationary at a gate, which is undesirable.

The present invention seeks to mitigate one or more of the above-mentioned problems. Alternatively or additionally, the present invention seeks to provide an improved method of parking an aircraft and/or an improved aircraft braking system.

SUMMARY OF THE INVENTION

According to an aspect of the present invention there is provided a method of operating an aircraft in order to hold the aircraft in a stationary and parked state. The aircraft comprises at least two brake systems for applying braking to one or more wheels of the aircraft. There is a first brake system, for example in the form of a pedal brake system, and a second brake system (different, at least in part, from the first brake system) for activating (or deactivating) an aircraft parking mode. The method comprises a step of manually using a first input device to command the application of braking to one or more wheels of the aircraft by the first brake system, for example when the aircraft is in a stationary state and already in a position and state ready to be parked and/or to slow the aircraft to such a stationary and/or ready-to-park state. The method comprises a step of manually using a second input device of the second brake system to activate the aircraft parking mode, while the first input device continues to be manually used to command the application of braking. In application of the method, after the aircraft parking mode has been activated, the first input device manually is used to generate a lower or zero braking command (for example a member of flight crew who had previously been manually using the first input device to command the application of braking may decide to release the first input device completely, possibly wrongly assuming that the aircraft is being securely held in a parked state solely by means of activations of the second braking system). In accordance with the method, an electronic control device overrides the lower braking command (including overriding a zero braking command), if certain first pre-set criteria are met, so that the braking force applied by the first braking system is higher than so commanded, for example not being reduced at all or being reduced to a lower amount, but still higher than commanded manually. The aircraft is then held in a parked state with use of the second braking system (preferably without any braking force being applied by means of the first braking system), for example after a certain period of time has elapsed. Ascertaining whether a certain period of time has elapsed may be performed with the use of an electronic clock signal. For example it may be that the control device uses a clock signal to ascertain whether a certain amount of time has elapsed from the time when the flight crew last activated the aircraft parking mode with the use of the second input device.

Embodiments which provide the function of the method according to this aspect of the present invention are able to mitigate against the risk of a pilot or other member of the flight crew releasing pedal braking prematurely, after having activated a parking brake system on an aircraft. Releasing pedal braking, or commanding a lower braking force from the first brake system, prematurely may be deemed to have occurred when a level of pedal braking force is commanded that is not sufficient to hold the aircraft in a stationary position, prior to the force provided solely by the second brake system (or parking brake) being sufficient to hold the aircraft in a stationary position. It can sometimes be the case, on certain aircraft and/or in certain conditions, that there is a delay after the parking brake system has been manually activated, until the parking brake is applying the required braking force at the wheels of the aircraft. It may sometimes be difficult for a member of flight crew to know exactly when to release the pedal brake, given that the aircraft is at that time stationary and that the park brake has already been activated. Embodiments of the invention are able to use appropriate signals, controls and/or other data to make an objective decision on when best to release completely the brake pedal force, and to intervene if a manual command would otherwise cause the brake pedal force to be undesirably and/or prematurely low. Such embodiments are thus able to augment flight crew actions, as a temporary measure, in certain scenarios.

As mentioned above, the first brake system may be considered as a pedal brake system. The first input device may for example be one or more brake pedals. It will be understood that the first brake system may have a first input device (for example there being one or more brake pedals) which is manually controllable to generate a braking command which causes a braking force to be applied to the wheels. The braking command may be variable thus facilitating the application of different values of braking force, within a given range of possible braking forces, to be applied to the one or more wheels. The amount of braking may thus be varied under the manual control of the first input device, from zero to full (or maximum) braking force for the brakes under the control of the first input device. The first brake system may comprise two or more pedals, each pedal being operable independently, so that different pedals are operable to cause braking of different wheels of the aircraft.

As mentioned above, the second brake system may be considered as a park brake system. The second input device of the second brake system may for example be a hand-operated park brake device such as a lever, handle, switch or button. It will be understood that the second brake system may apply braking to one or more wheels being in common with the one or more wheels braked by the first brake system. The second brake system has a second input device which is manually controllable to activate an aircraft parking mode. The second input device may be configured to have two states only: on or off, for example. The second input device may be configured to have three states only: on signal commanded, off signal commanded and no signal commanded, for example. The activation of the aircraft parking mode is configured, at least once fully activated, to cause a braking force sufficient to hold the aircraft stationary in a parked state to be applied to one or more wheel brakes. The time between activation of the aircraft parking mode (i.e.

initial command) and the moment at which the braking force is sufficient to hold the aircraft in its parked state often takes at least several seconds to happen. It is preferred that the same second input device (which may comprise separate parts—e.g. an on button and an off button) is manually controllable to de-activate the aircraft parking mode so that the braking force is (possibly after a delay of several seconds) reduced to a level (e.g. zero) at which the aircraft is released from its parked state, so that the aircraft can freely move relative to the ground on its wheels.

It is mentioned above that an electronic control device can override a manually instigated lower braking command, if certain first pre-set criteria are met, so that the braking force applied by the first braking system is higher than manually commanded. In other words, the first pre-set criteria are used by the electronic control device to assess whether to override a lower manually-instructed braking command or not. The electronic control device may deem such first pre-set criteria to be met in view of one or more inputs to the electronic control device. The inputs may be signals, data or the like for example relating to the status, condition of the aircraft, an aircraft control system or other part of the aircraft. Such inputs may be processed, for example with the use of a logic circuit, software or the like, to produce an output which determines whether (or not) the first pre-set criteria have been met. It may be that there are multiple inputs (optionally alongside other inputs) each being binary in nature (e.g. TRUE/FALSE or "on"/"off") and/or which are used to produce such a binary parameter, which are collectively used to assess whether the criteria are met. For example, three or more tests may all need to be true for the criteria to be met. One such input may include a time-dependent parameter that relates to when, e.g. the time at which, or time since, the second input device is used to activate the aircraft parking mode. For example, whether or not the time-dependent parameter is deemed to be TRUE may depend on whether the time elapsed since the time at which the aircraft parking mode has been instigated is less than a pre-set delay.

The first pre-set criteria may include whether a level of accumulator pressure in a hydraulic system is less than (or not greater than) a threshold value. For example, the first pre-set criteria may include whether, or not, a threshold level of accumulator pressure in the second brake system is met. The level of accumulator pressure may for example be measured by a sensor.

The method may include a step of the electronic control device ceasing, if certain second pre-set criteria are met, its overriding of the braking command, if any, from the first input device. The second pre-set criteria used by the electronic control device may include whether a time period has elapsed. Such a time period may be a pre-set delay after the time at which the second input device is used to activate the aircraft parking mode. In embodiments, it may be that whether the second pre-set criteria are met includes an assessment of a time-dependent parameter, for example whether the time elapsed since the time at which the aircraft parking mode has been instigated is less than a pre-set delay. The function of the electronic control device (e.g. including the overriding of the lower braking command) can be viewed as being equivalent to automatically holding the braking force applied by the first braking system at a certain level if the certain criteria are met.

It may be that during a single performance of the entire method (e.g. placing the aircraft in a parking mode) the first pre-set criteria are tested once—for example as a trigger (e.g. which holds the pedal braking "on" for a pre-set time—with the overriding being turned "off" only when the second pre-set criteria are met).

There may be embodiments in which the first pre-set criteria are regularly tested during performance of the method—e.g. many times per second. It may be that the step of the electronic control device ceasing the overriding of the lower braking command is caused by checking whether the first pre-set criteria are no longer met. In other words, the second pre-set criteria being met may correspond to the first criteria not being met. For example, if meeting the first criteria require all of "Condition A" AND "Condition B" AND "Condition C" to be met, then it may follow that the second criteria require that any of "Condition A" OR "Condition B" OR "Condition C" are not met, and vice versa.

The second pre-set criteria (e.g. the criteria used by the electronic control device to decide whether to cease the overriding of the manually effected braking command) may include the level of braking commanded by the second brake system (e.g. the parking brake). For example, if the park brake is deactivated (e.g. for a certain period of time, which may be a very short time, or a longer time such as at least one second) the method may include the control device ceasing to override a lower braking command from the first brake system. Such a function may require the park brake to be deactivated for a period of time longer than a threshold time, so that for example if the second brake system is deactivated and quickly reactivated (e.g. turned off and on again, from a perception by flight crew that the braking system has not recognised the initial activation of the second brake system) the control device does not cease its overriding of the lower braking command from the first brake system.

The second pre-set criteria may include a level of braking force being applied (e.g. hydraulic pressure in a hydraulic system supplying hydraulic brakes or force applied by—or displacement of—a brake piston). The level of braking force being applied may for example be measured by a sensor. It will be understood that if the level of braking force applied is to be used as part of the second pre-set criteria it will be a measure of the level of braking force actually being applied.

The second pre-set criteria may include whether a level of accumulator pressure in a hydraulic system meets a threshold value (e.g. greater than, or not less than, the threshold value). The second pre-set criteria may include whether, or not, a threshold level of accumulator pressure in the second brake system is met. The level of accumulator pressure may for example be measured by a sensor.

Thus, in an example embodiment, there is a method of controlling the brakes of an aircraft, wherein when a park brake is activated immediately following continued use of a separate brake pedal (and optionally certain other aircraft conditions are met—e.g. if the aircraft is stationary and/or aircraft is not in a take-off mode) a control system automatically sustains a pedal brake force (e.g. on a brake piston) despite the brake pedal being manually released and, optionally, automatically releasing the pedal brake force on the brake piston caused by the control system at the earliest of i) a specified time having passed (e.g. ten seconds) and ii) the detection of a sufficient park brake force on the brake piston, and optionally iii) one or more other criteria (e.g. the park brake is manually deactivated).

It may be that the method includes testing for a park brake system fault, and if one is so detected requiring the electronic control device to override a lower braking command for longer than would otherwise be the case. For example, it may be that the second pre-set criteria (e.g. the criteria used by the electronic control device to decide whether to cease the overriding of the manually effected braking command) used by the electronic control device include whether a time period has elapsed, the time period being determined by a pre-set delay after the time at which a park brake system fault is detected.

Deciding whether the first pre-set criteria (e.g. those criteria used by the electronic control device to decide whether to override the manually effected lower braking command) are met may include using the speed of the aircraft and/or whether the aircraft is in take-off mode. Deciding whether the first pre-set criteria are met may include assessing whether a park brake system fault is detected. The electronic control device may receive an input (e.g. data and/or an electronic signal) that relates to the ground speed of the aircraft. Deciding whether the first pre-set criteria are met may include assessing the amount of brake pressure provided by the second brake system. The electronic control device may receive an input (e.g. data and/or an electronic signal) that relates to the amount of braking force provided by the second braking system.

One example embodiment operates such that the electronic control device initially overrides the lower braking command (in the case where the aircraft parking mode has been activated, and the first input device—e.g. brake pedal—is used to generate a lower or zero braking command) if the electronic control device determines, in view of one or more input signal(s) received at the electronic control device, that (a) the aircraft is not in take-off mode, and (b) the aircraft is not moving at a speed of more than a threshold speed, the threshold speed for example being less than 15 knots (optionally less than 10 knots, and possibly deeming that the aircraft is substantially stationary), and optionally one or more other tests. One example embodiment, e.g. the same embodiment, operates so that the electronic control device continues to override a manually effected lower braking command for a time period (which may be a fixed time period and/or which is preferably at least five seconds after the time at which the second input device—e.g. park brake—is used to activate the aircraft parking mode), unless the electronic control device determines in view of one or more input signal(s) received at the electronic control device that (c) the second input device has been used to deactivate the aircraft parking mode for a time longer than a threshold time, the threshold time being less than 5 seconds (this, for example, excluding a case where the second input device has only been used to deactivate the aircraft parking mode for a very short period of time before being re-activated—it being "turned off and on again" for example), or (d) the level of braking force being applied under the command of the second brake system is higher than a pre-set threshold, and optionally one or more other tests. It will be appreciated that the multiple criteria (a) to (d) mentioned above may for example correspond to one or more of the above-mentioned first criteria and/or second criteria.

The second brake system may be configured to be able to be used in an emergency scenario for emergency braking in the case where the first brake system is not performing adequately. The first brake system may have brake pads and/or brake pistons in common with the second brake system. It may be that brake pads and/or brake pistons of the first brake system are different from the brake pads and/or brake pistons of the second brake system. It may be that the first and second brake systems utilise independent hydraulic circuits. The first and second brake systems may act on the same wheel, for example despite otherwise being independent of each other. The brake pack associated with a wheel may for example be a dual cavity brake pack with a first cavity being part of a hydraulic manifold system associated with the first brake system and a second cavity being part of a hydraulic manifold system associated with the second brake system. It may be that the first brake system has a first set of brake pistons operated by a first hydraulic circuit which act on a brake pack associated with one or more wheels of the aircraft and the second brake system has a second set of brake pistons operated by a second hydraulic circuit which act on a brake pack (optionally the same brake pack), for example the first set of brake pistons being different from and independent of the second set of brake pistons. It may also be that the first hydraulic circuit is different from (and optionally independent of) the second hydraulic circuit. It will be appreciated that the brakes need not necessarily be controlled by a hydraulic circuit that extends entirely between the brakes actuated and the input device used by flight crew to cause the brakes to be so actuated. The input device, e.g. hand-operated park brake, brake pedals, or the like, may generated an electronic control signal that causes actuation of the brake, which may (or may not) be effected by the electric actuation of a hydraulic piston. It will therefore be understood that embodiments of the present invention have application in relation to hydraulic brake systems as well as brake systems that are at least partially electrical/electronic. The wheel brakes may be electric brakes.

There may be a third brake system for one or more wheels of the aircraft, the third brake system being a back-up (e.g. alternate) braking system that is configured to provide braking facilities in the event of failure of the first brake system (and/or in the event of failure of the second brake system). In some embodiments the provision of such a third brake system may therefore provide some redundancy for safety purposes. There may nevertheless be parts of the first and third brake system that are shared. There may be some embodiments in which the second park brake system (e.g. park brake) provides a back-up in the event of failure, or inadequate performance, of both the first park brake system (e.g. primary/normal pedal braking) and the third park brake system (e.g. secondary/alternate pedal braking).

The control device may be configured such that, if it overrides/intervenes the manual braking commands effected by flight crew, it also generates an output that is used to alert flight crew of this fact. For example, the control device may be configured to provide an audible and/or visual message to flight crew (which could simply be a warning light or the display of appropriate text on a visual display unit in the cockpit) if the control device is caused to override/intervene in a manual braking command.

The control device may be configured such that if it overrides/intervenes in a manual braking command, the braking force and/or braking pressure applied is restricted from exceeding a maximum permitted threshold amount (which is preferably a fixed and pre-set level, but which in other embodiments could be predetermined on the basis of one or more other parameters).

The present invention also provides, according to a further aspect, a method of parking an aircraft. Such a method may comprise a step of one or more members of flight crew pressing one or more brake pedals to cause brake force to be applied to the brakes of one or more wheels of the aircraft when the aircraft is in a state (e.g. is stationary or substantially stationary) ready to be parked. There may then be a step of a member of flight crew activating a parking brake device, and a subsequent step of the flight crew then releasing the one or more brake pedals that was being pressed. In accordance with this aspect of the invention, an electronic control device is provided which automatically intervenes, following the releasing of the brake pedal(s) by the flight crew, to cause brake force to continue to be applied to at least some of the brakes of the wheels. This is preferably continued at least until sufficient brake force is applied, as a result of the activation of the parking brake device, to hold the aircraft in its parked state. Such automated intervening may be particularly beneficial in embodiments in which the aircraft is so configured that if no other wheel braking is applied there would be a delay between the activation of the parking brake device and sufficient brake force being applied by the wheel brakes to hold the aircraft in its parked state (i.e. preferably sufficient brake force to reliably hold the aircraft safely in its parked state).

The present invention also provides, according to a yet further aspect, an electronic control device as described and/or as claimed herein. Such an electronic control device may for example be configured to perform the function of the electronic control device of the methods described above. For example, the control device may be configured to override a manually provided braking command during parking of an aircraft, if certain criteria are met, so as to cause a braking force to be applied by a braking system of the aircraft this is higher than it would be otherwise. Such an electronic control device may be provided separately from the aircraft, for example as part of a kit of parts to be installed, or retrofitted, in an existing aircraft. Such an electronic control device may be provided installed in an aircraft. Thus, the present invention also provides an aircraft in which such an electronic control device is provided. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft. Such an aircraft may be in the form of a commercial fixed-wing passenger aircraft.

The aircraft comprises a plurality of wheels and first and second brake systems each for braking one or more of said wheels, for example the brake systems being as described above.

It may be that the electronic control device is configured to monitor the braking command demanded by the first brake system and/or a level of braking actually applied by the first brake system. The electronic control device may be configured to receive an input from a sensor that indicates the amount of braking demanded by the first input device (for example a measure of the position of a braking pedal). The electronic control device may be configured to receive an input from a sensor that indicates the amount of braking applied by a part of the first brake system (for example a measure of braking force or braking pressure actually applied by a part of the first brake system, e.g. a braking piston or actuator).

It may be that the electronic control device is configured to monitor an accumulator pressure in the first brake system. The electronic control device may be configured to receive an input from a sensor that indicates the amount of pressure in an accumulator in the first brake system.

It may be that the electronic control device is configured to monitor the braking command demanded by the second brake system and/or a level of braking actually applied by the second brake system. The electronic control device may be configured to receive an input from a sensor that indicates the amount of braking demanded by the second input device (for example a measure of the position of a park brake handle, lever, button or the like). The electronic control device may be configured to receive an input from a sensor that indicates the amount of braking applied by a part of the second brake system (for example a measure of braking force or braking pressure actually applied by a part of the second brake system, e.g. a braking piston or actuator).

It may be that the electronic control device is configured to monitor an accumulator pressure in the second brake system. The electronic control device may be configured to receive an input from a sensor that indicates the amount of pressure in an accumulator in the second brake system.

It may be that the electronic control device is configured to apply, for example in the event that certain first pre-set criteria are met, a higher level of braking by the first brake system than would otherwise be applied. It may be that the electronic control device is configured to cease to apply, for example in the event that certain second pre-set criteria are met, said higher level of braking by the first brake system.

The first pre-set criteria may include the flight crew activating the aircraft parking mode with the use of the second input device (which may be assessed with the use of an input received by the electronic control device). The first pre-set criteria may include there being a premature reduction in the braking command demanded by the first brake system and/or in the level of braking actually applied by the first brake system. For example, such a premature reduction in braking may be assessed with the use of an appropriate sensor and/or assessed with the use of an input received by the electronic control device.

The second pre-set criteria may include whether the aircraft parking mode is demanded by the second input device active (e.g. by using an output from a sensor that measures the position/state of the second input device and/or with the use of an appropriate input received by the electronic control device). For example, if the aircraft parking mode ceases to be demanded then it may be the case that the higher level of braking by the first brake system is no longer required. The second pre-set criteria may include whether it can be concluded that a braking force sufficient to hold the aircraft stationary in the parked state is being applied to one or more wheel brakes. This may be concluded on the basis of a certain time having elapsed since the aircraft parking mode has activated, as measured via an electronic clock signal for example. Alternatively, or additionally, this may be concluded on the basis of a measurement of braking force applied and/or braking pressure, as measured by an appropriate sensor, for example with the output of the sensor being used (with or without further modification or processing) as an input to the electronic control device.

As mentioned above, it may be that the control device uses a clock signal. The control device may be configured to compute or generate an electronic clock signal. The control device may be configured to receive an electronic clock signal from other systems on the aircraft. The control device may be configured to receive an input from which the control device can determine how much time has elapsed since the aircraft parking mode has activated.

The control device may be configured to receive an input from which the control device can determine whether a park brake has been activated by flight crew.

The control device may be configured to receive an input from which the control device can determine whether pedal braking is active (for example, determining the amount of pedal braking).

The control device may be configured to receive an input from which the control device can determine information relating to aircraft ground speed-which may for example be in the form of receiving an input which provides an direct indication of aircraft ground speed or which could be whether the aircraft ground speed meets certain speed criteria (e.g. a binary input from which it can be determined whether the aircraft ground speed is less than a threshold speed, or not).

The control device may be configured to receive an input from a braking force sensor which detects the brake pressure or brake force applied by one of the brake systems of the aircraft.

The control device may be configured to receive an input from which the control device can determine whether a parking brake fault exists.

The control device may be configured to provide an output which causes braking to be effected by a braking system of an aircraft. The control device may be configured to provide an output which provides information to flight crew. Such information may for example be that the control device has overridden a flight crew braking (including no braking) command. Such information may for example be that the control device has detected a fault in the aircraft braking system.

The control device may be part of, or be provided by, an aircraft brake control system. Thus, in an example embodiment, there is an aircraft brake control system configured to automatically continue to apply a pedal brake force to a brake piston for a time period after a park brake actuator is activated, even when a brake pedal (i.e. the brake pedal which initially caused the pedal brake force to be applied by the brake piston) is manually released/deactivated, optionally the aircraft brake control system automatically releasing the pedal brake force (and/or not continuing to apply such a brake force initially) if any of the following conditions are true: (a) the aircraft is travelling at a ground speed of greater than a threshold value; (b) the aircraft is in take-off mode; (c) flight crew manually deactivate the pedal brake actuator (for example for longer than a threshold time); and, optionally, (d) other criteria. The aircraft brake control system may be part of a system that controls and/or monitors both braking and steering of the aircraft.

The control device may be a suitably programmed programmable control device. The control device may form part of a bigger system. For example the control device function may be provided by a computer system of the aircraft, which may perform other one or many other functions. The control device may thus function under the control of a computer program. The present invention this provides according to a further aspect, a computer program comprising instructions which, when the program is executed by a programmable control device, cause the control device to carry out the function of the electronic control device as claimed or described herein. The computer program may be recorded electronically in memory of the control device. The computer program may be embodied on a product, for example on computer-readable media, which allows the program to be transferred to a programmable control device.

The computer program when executed on a control device, such as a computer (e.g. of a steering and braking control system), may cause the control device to switch between various different modes of operation. One such mode of operation may be parking mode. One such mode of operation may be normal braking mode. One such mode of operation may be alternate braking mode (i.e. as an alternative to normal braking mode and thus utilising different parts of hardware and/or hydraulics in doing so). One such mode of operation may be emergency braking mode. When (and/or immediately before) the control device operates in parking mode, the computer program may instruct the device to augment the flight crew's actions, on a temporary basis only, to effect pedal braking at a level higher than instructed by flight crew in order to ensure that an appropriate level of braking is applied to the wheels of the aircraft when transitioning to the parking mode.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 3 shows a side view of a landing gear assembly of the aircraft of FIG. 1, showing two wheels with brake packs attached according to the first embodiment;

DETAILED DESCRIPTION

Example embodiments are set out in the accompanying figures and are now described. The embodiments relate to a braking control apparatus for assisting flight crew in parking an aircraft.

Figure 1:
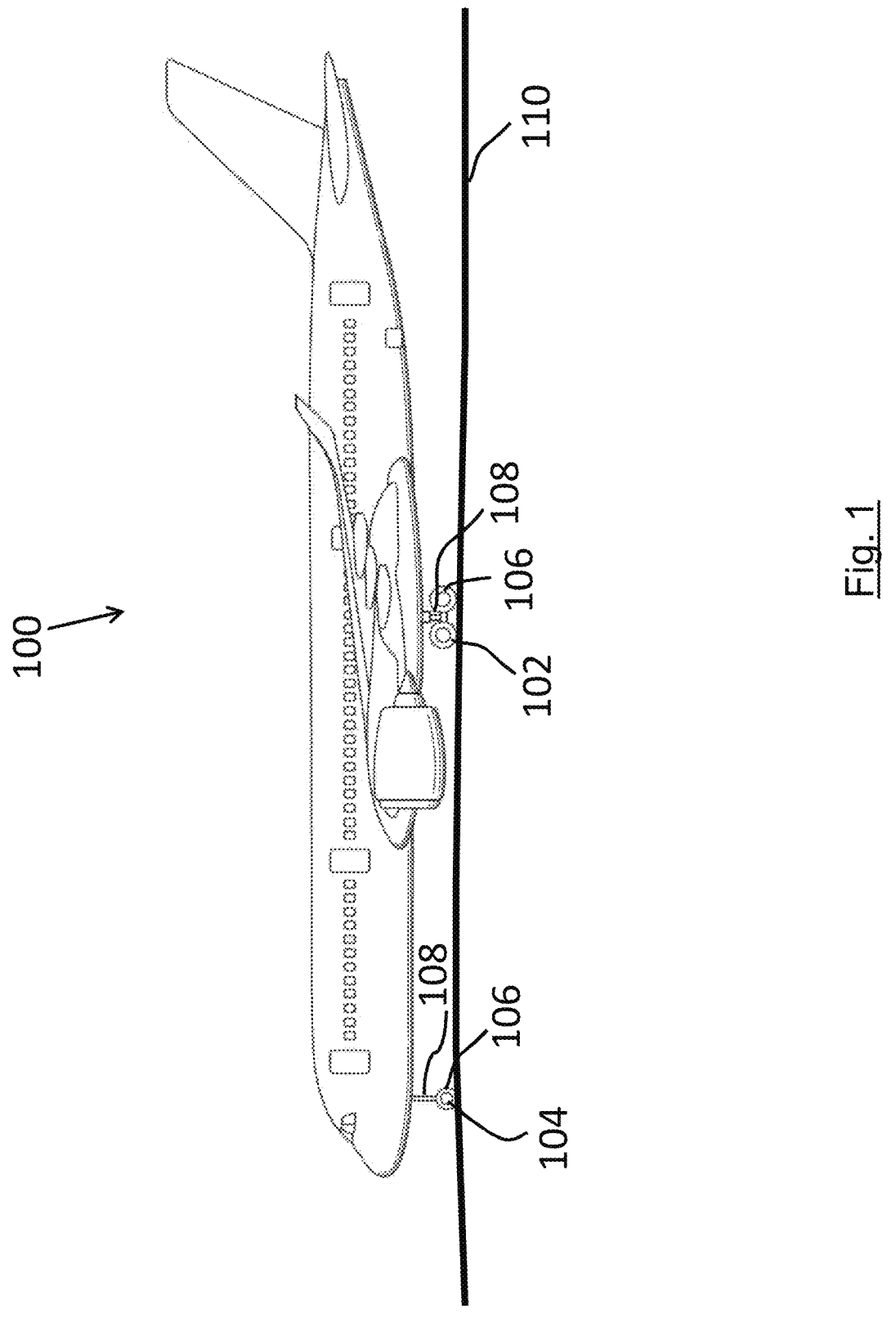
FIG. 1 shows an aircraft with its landing gear extended and in contact with the ground according to a first embodiment.
Figure 2:
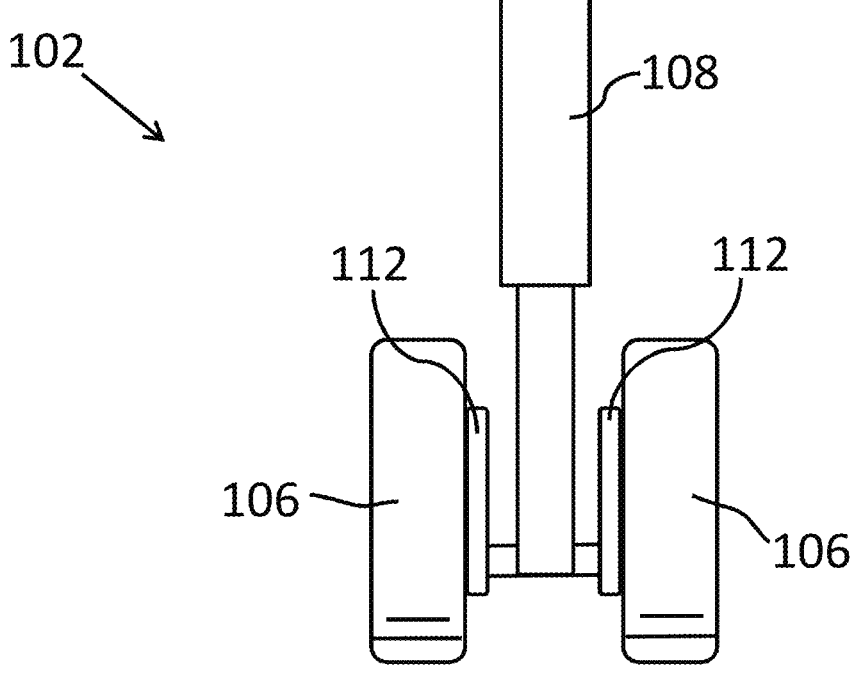
FIG. 2 shows a front view of a landing gear assembly of the aircraft of FIG. 1, showing two wheels with brake packs according to the first embodiment.

The first embodiment is shown in FIGS. 1, 2, 3, 4, 5*b* and 6. FIG. 1 shows an aircraft 100. The aircraft is supported by a main landing gear assembly 102 and a nose landing gear assembly 104. The landing gear assemblies include a main strut 108 and wheels 106 that are in contact with the ground 110. The wheels of the landing gear are each attached to a brake pack 112, which is shown in FIG. 2 and FIG. 3. The brake packs 112 each contain multiple brake pistons which can be actuated in order to reduce the speed of rotation of the wheel by generating heat through friction. FIG. 3 shows a first embodiment of the invention, in which each brake pack contains two pedal brake pistons 114 and two park brake pistons 116. The pedal brake pistons 114 are controlled through a first brake control system. The park brake pistons

116 are controlled through a second, separate, brake control system. The pistons are shown with a dashed outline to indicate that they are not visible from the outside of the landing gear, as they are situated inside the brake pack, which is located on the inner side of each wheel as shown in FIG. 2.

The park brake system is used for permanent application of the braking to the aircraft wheels when the crew wish to maintain the aircraft in a fixed location and do not wish to hold it on pedal braking or when the aircraft is to be unmanned to so that the aircraft is maintained in its parked location. The park brake system also provides a back-up to the primary (normal braking) and secondary (alternate braking) systems. In the event of a failure of both normal and alternate systems the flight crew can activate the park brake system to retard the aircraft in such a fault scenario. Activation of this mode is typically referred to as "ultimate braking" and is effectively an emergency stop. In such a scenario, when the park brake is applied the crew may or may not still be trying to apply pedal brake pressure and the normal braking may or may not recover from the fault event during this time and become active whilst ultimate braking is being applied. The remainder of the description of the first embodiment will refer to the park brake system and the (normal) pedal brake system, and will not refer to the alternative braking system.

The braking control apparatus is arranged to determine the status of the various components which make up the apparatus such as park brake handle position, hydraulic actuators and hydraulic pressure transducers. It then identifies if there is a discrepancy which indicates a fault in, for example the park brake system and it alerts the flight crew.

Figure 4:
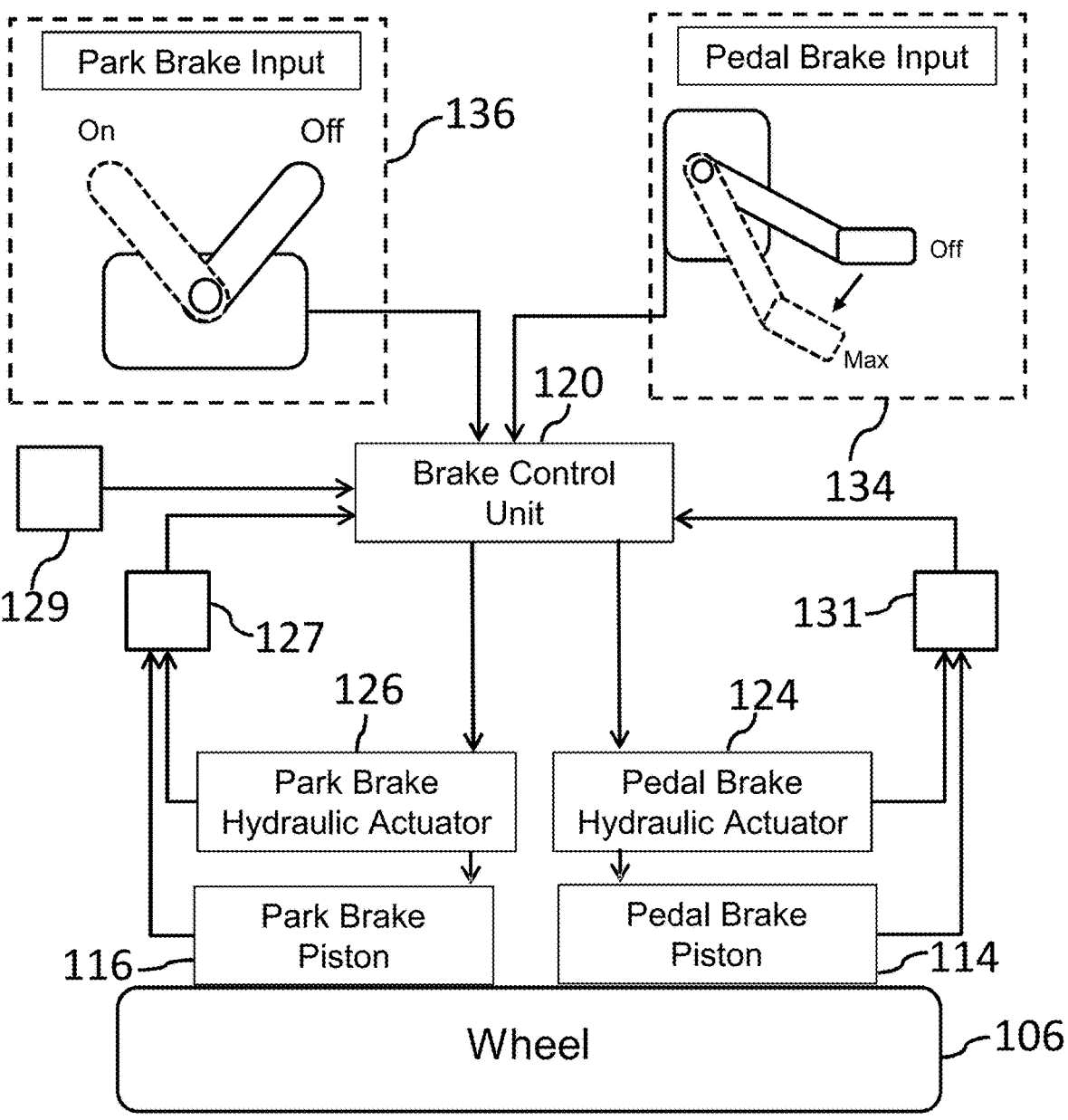
FIG. 4 is a schematic diagram showing the function of the aircraft braking system according to the first embodiment.

FIG. 4 shows a schematic of the braking control apparatus of the aircraft. The braking control apparatus comprises a park brake input 136 which when manually operated by the flight crew to an "on" position sends a command to the brake control unit 120 to operate the park brake hydraulic system which causes an actuator 126 to actuate the park brake piston 116 which applies a force to the wheel. Similarly, the braking control apparatus also comprises a pedal brake input 134 which is manually controllable to generate a braking command which causes a braking force to be applied that can be different values across a range of braking forces. The operation of the pedal brake input 134 causes a command to be sent to the brake control unit 120 which causes the pedal brake hydraulic actuator 124 to actuate the pedal brake piston 114 to an extent that is dependent on the displacement of the pedal brake input 134 from the "off" position. The pedal brake piston 114 applies a force to the wheel that is approximately proportional to the extent of displacement of the pedal brake input 134 (or at least such that an increased displacement of the pedal brake input 134 causes an increased braking force to be applied to the wheel). The braking control apparatus also comprises an aircraft speed sensor 129, a sensor unit 127 to detect the operation of the park brake hydraulic actuator and to measure the force on the park brake piston and a similar sensor 131 for the pedal brake system.

The braking control apparatus of the aircraft makes use of a dual cavity braking system at the wheel with the (normal) pedal braking system and the park brake system each supplying one of the two brake cavities/pistons.

In use, when the aircraft 100 has landed and is being maneuvered towards a gate, the flight crew applies the pedal brake input 134 to slow the aircraft. This sends a command to the brake control unit 120 to operate the pedal brake hydraulic actuator 124, which actuates the pedal brake piston 114. This applies a force to the wheel of the aircraft 100, which reduces the speed of the aircraft. Once the aircraft 100 has been brought to a halt in the desired position, the flight crew will operate the park brake input 136 while maintaining the pedal brake input 134 in an "on" position (i.e. continuing to apply pedal braking). The park brake input 136 will send a command to the brake control unit 120 to operate the park brake hydraulic actuator 126. Once the park brake input 136 is in the "on" position the crew will then release the pedal brake input 134 which will return to an "off" position. The pedal brake input 134 is then issuing a command to the brake control unit 120 to reduce the force on the pedal brake piston 114 to zero. Provided that certain pre-set criteria are met, the brake control unit 120 overrides this lower braking command and continues to operate the pedal brake hydraulic actuator 124 to provide force on the pedal brake piston 114, so that the braking force applied by the pedal brake piston 114 is higher than commanded. This may be considered as the brake control unit 120 automatically performing a pedal brake hold mode, thus overriding the flight crew's manual release of the brake pedal(s). The mode mitigates the risk of aircraft movement in the event of a failure or poor performance (such as a hydraulic valve responding slowly to an activation request) of the park brake system.

In this embodiment, the brake control unit 120 initiates the overriding of a manually effected lower braking command (i.e. enters the pedal brake hold mode) if, and only if, the brake control unit 120 determines that the speed of the aircraft (as measured by the speed sensor 129) is below 5 knots (i.e. stationary or close to stationary) and the aircraft is not in take-off mode. Of course, it is also the case that the automatic override only occurs in a case where the park brake is activated and the pedal braking command is reduced at or shortly after the park brake is activated.

The brake control unit 120 automatically holds on pedal braking for ten seconds (from the time at which the park brake input 136 was set to "on") or, if earlier, until the level of braking force applied by the park brake piston 116 (as determined by the control unit 120 from the measurement signal received from the sensor unit 127) is above a threshold force (a threshold force deemed to be high enough that the aircraft can be assumed to be safely parked and held stationary by the park brake system). The brake control unit 120 may also release its automatic pedal braking if the brake control unit 120 determines that the speed of the aircraft is no longer below 5 knots, the aircraft is put into its take-off mode, the park brake is deactivated or pedal braking is recommenced by the flight crew. Disabling the pedal brake hold mode if the control unit detects an aircraft speed greater than 5 knots prevents application of this mode in the event of application by the flight crew of ultimate braking during take-off or landing. Thus, this new function would not be enabled and full maneuverability of the aircraft would still be available immediately after an ultimate braking event.

It will be understood that when the brake control unit 120 ceases to override the lower braking command it operates the pedal brake hydraulic actuator 124 to reduce the force applied by the pedal brake piston 114 to a minimum, which may be zero.

There are also other modes of operation of the braking control apparatus. In the case where a fault has been detected in the park brake system by a park brake fault monitoring system (which may include or be formed by the park brake sensor unit 127), the brake control unit 120 automatically holds on the pedal braking for longer than the normal time of ten seconds—e.g. by holding on pedal braking for thirty seconds. When a fault is detected, the flight crew is alerted in the cockpit by the park brake fault monitoring system. The cockpit may also include a display of the park brake pressure/force by means of park brake sensor unit 127. This allows braking to continue to be applied to the aircraft even in the event of a park brake failure, and has the advantage of not requiring the flight crew to immediately respond to the fault in order to prevent the aircraft rolling away from its correct parking position. It is common for a fault in the park brake system to be detected by the park brake sensor unit 127 only after the park brake input 136 causes the brake control unit 120 to command the park brake piston 116 to activate. There may be a delay in detecting a fault of between 4 and 8 seconds. The pedal brake hold mode provided by the present embodiment thus prevents aircraft movement while the flight crew can take mitigating action by re-applying pedal brake pressure before the pedal brake hold function expires, warning the ground crew and requesting the ground crew chock the wheels of the aircraft before the flight crew release pedal brake pressure, and so on.

There may be a mode of operation in which if the park brake input 136 is turned off and then back on again within a short period of time, for example less than 2 seconds, the brake control unit 120 does not cease its overriding of the lower braking command. It might instead re-start the ten second period of holding on the pedal brakes.

Figure 5A:
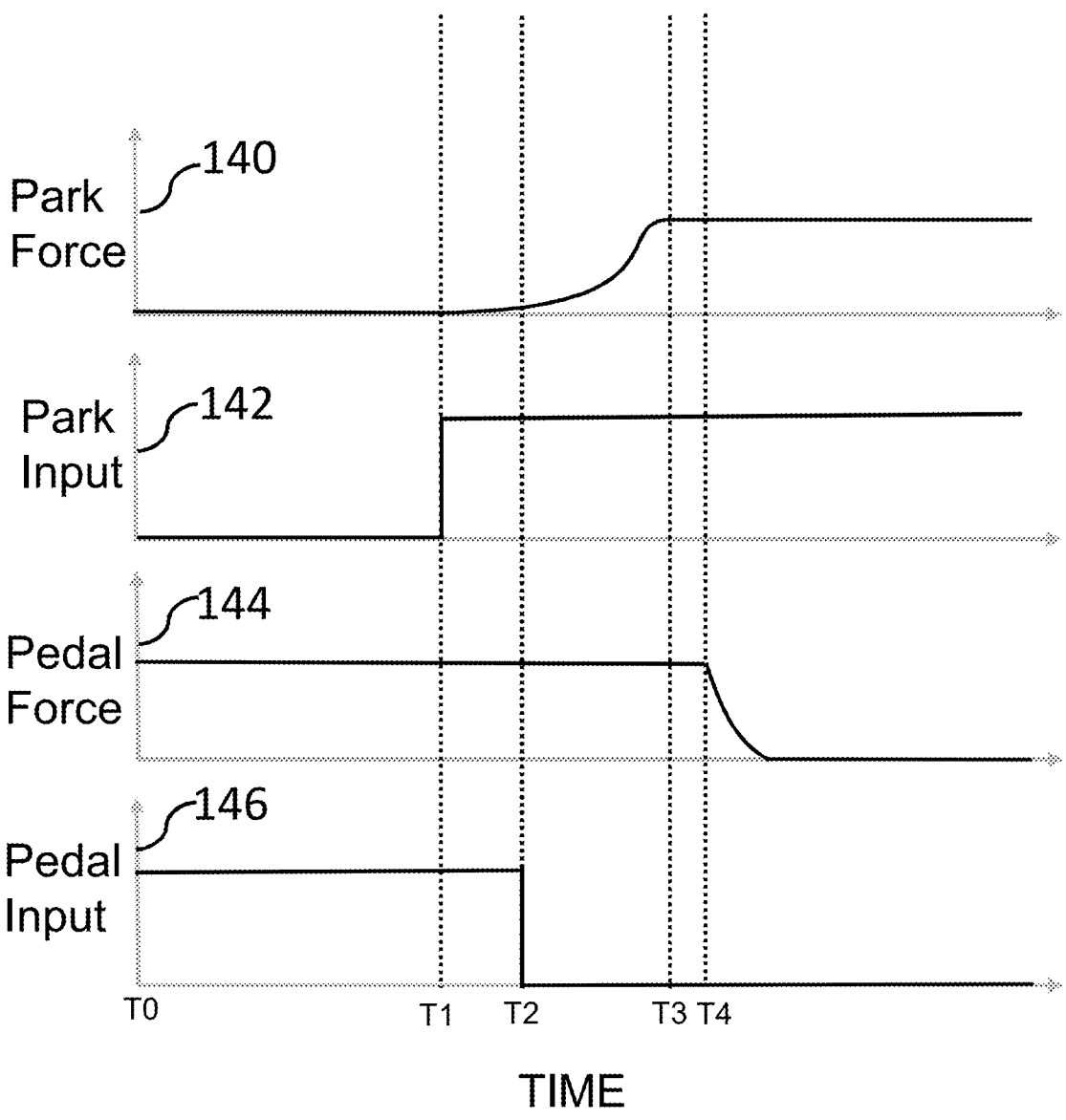
FIG. 5*a* shows a series of graphs illustrating when brake inputs are applied and when brake force is applied with respect to time in an aircraft according to the first embodiment.
Figure 5B:
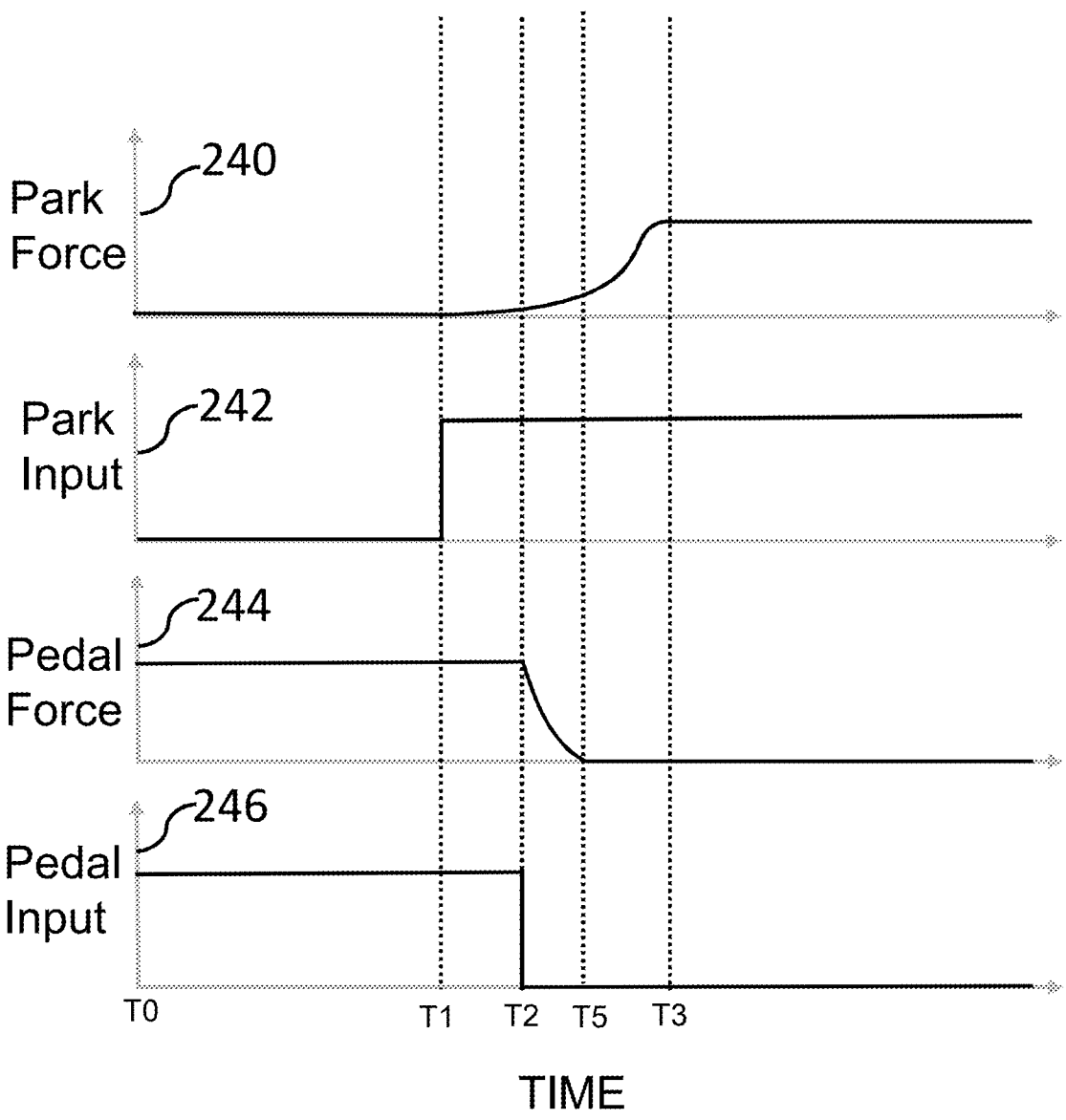
FIG. 5*b* shows a series of graphs illustrating when brake inputs are applied and when brake force is applied with respect to time in an aircraft that does not employ the present invention.

FIG. 5a shows a series of graphs illustrating when brake inputs are applied and when brake force is applied with respect to time in an aircraft according to the first embodiment of the invention. It will be appreciated that the lines of the graphs of FIGS. 5a and 5b are schematic and that the rates of change shown by the gradient in each graph may be different in reality; the graphs are included more to show the differences in timing of changes in the braking system inputs and outputs. Graph 140 shows the application of park brake force by the park brake piston 116 against time. Graph 142 shows the output of the park brake input 136 against time. Graph 144 shows the application of pedal brake force by the pedal brake piston 114 against time. Graph 146 shows the output of the pedal brake input 134 against time. In use, when the aircraft 100 has landed and is being maneuvered towards a gate, the flight crew applies the pedal brake input 134. This sends a command to the brake control unit 120 to operate the pedal brake hydraulic actuator 124, which actuates the pedal brake piston 114. This applies a force to the wheel of the aircraft 100. At time TO graph 146 shows that the pedal brake input 134 is already applied and graph 144 shows that the pedal brake force is already applied. Once the aircraft 100 has been brought to a halt the flight crew will operate the park brake input 136 at time T1. Graph 142 shows that the park brake input is set to "on" at time T1. The park brake input 136 will send a command to the brake control unit 120 to operate the park brake hydraulic actuator 126. Graph 140 shows that from time T1 to T3 the park brake hydraulic actuator 126 is increasing the force on the park brake piston 116, until it reaches a maximum force at time T3. Once the park brake input 136 is in the "on" position the crew will then release the pedal brake input 134 (possibly prematurely) which will return to an "off" position, as can be seen at time T2 on Graph 146. The pedal brake input 134 will issue a command to the brake control unit 120 to reduce the force on the pedal brake piston 114 to a minimum. In this example of the first embodiment the pre-set criteria are met, so the brake control unit 120 will override this lower braking command and continue to operate the pedal brake hydraulic actuator 124 to provide force on the pedal brake piston 114, so that the braking force applied by the pedal brake piston 114 is higher than commanded. Although the pedal brake input is released at time T2 as shown on graph 146, the pedal brake force is automatically maintained by the brake control unit 120 until time T4, as shown on graph 144. At time T4 the brake control unit 120 ceases to override the lower braking command due to the park brake sensor unit 127 indicating that a force that is sufficient to hold the aircraft in a stationary position has been measured at the park brake piston 116 (or sufficient time has passed). When the brake control unit 120 ceases to override the lower braking command, it operates the pedal brake hydraulic actuator 124 to reduce the force applied by the pedal brake piston 114 to a minimum. Graph 144 shows that from time T4 onwards, the pedal brake force is reduced to a minimum.

By way of contrast with the graphs of FIG. 5a, FIG. 5b shows a similar series of graphs as shown in FIG. 5a, but which apply to an aircraft that has a braking control apparatus including both a park brake and a pedal brake, but does not employ the present invention. Graph 244 shows that at time T2 when the pedal brake input is released, the braking control apparatus operates the pedal brake hydraulic actuator to reduce the force on the pedal brake piston to a minimum. Graphs 244 and 240 show that from time T5 to T3, the pedal brake force is at a minimum but the park brake force has not yet reached its maximum. It is possible that during this time period the brake force applied to the aircraft may not be sufficient to hold it in a stationary position. In this case a fault or poor performance might enable a scenario in which the brake pedals are released prematurely allowing the aircraft to move unintentionally, creating a hazard to people and aircraft and ground equipment.

Figure 6:
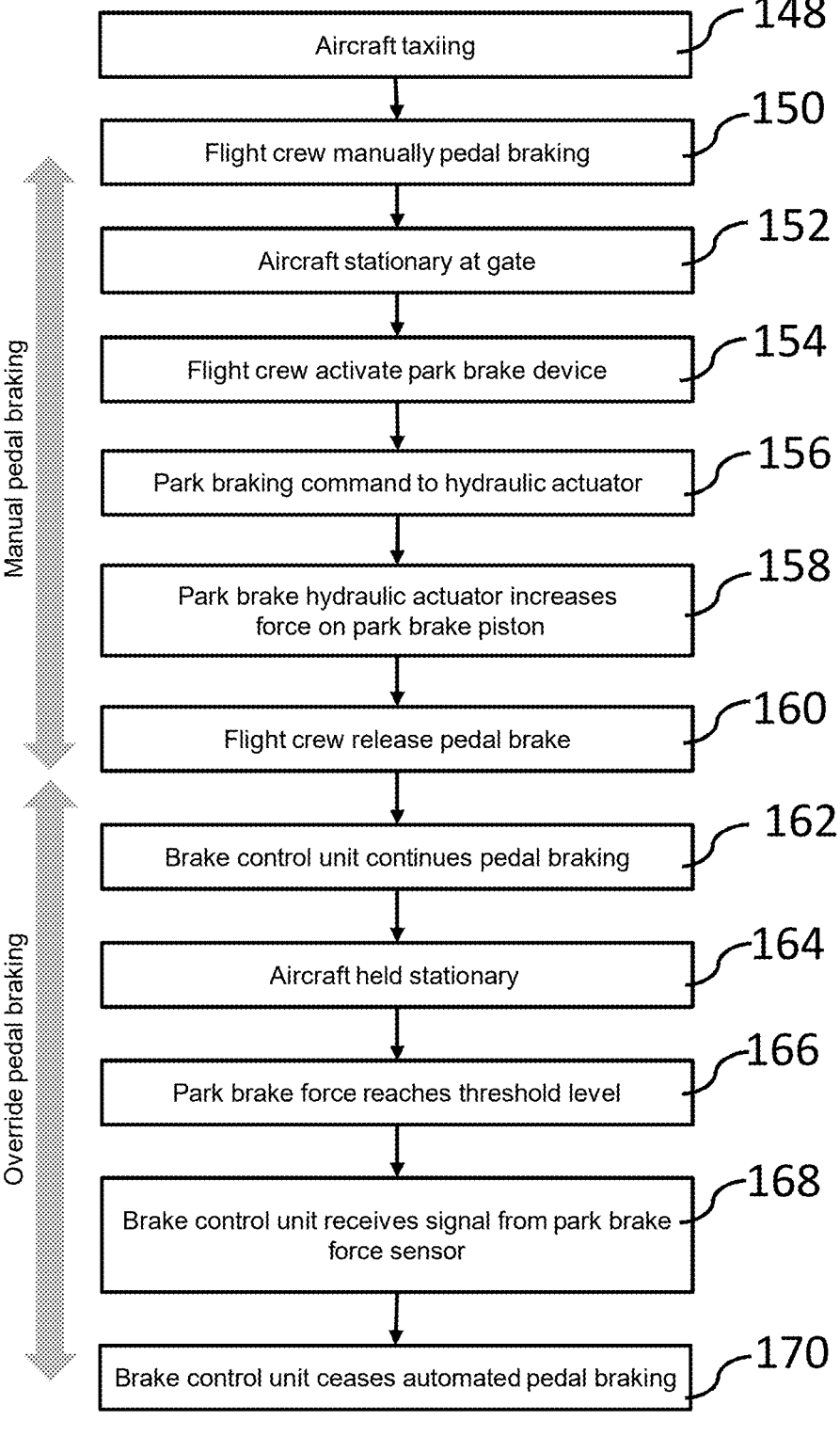
FIG. 6 is a flow diagram illustrating an example method according to the first embodiment of the invention.

FIG. 6 is a flow diagram illustrating an example operation using the apparatus of the first embodiment of the invention. In this example the aircraft is moving along the ground during parking (step 148). The flight crew then manually use the pedal brake input to command the application of pedal brake force to the pedal brake piston (step 150) to slow the aircraft. The aircraft is maneuvered into position at the gate and is brought to a stop (step 152). The flight crew then manually activate the park brake turning it from "off" to "on" while the pedal braking input is still applied by crew (step 154). The park brake input sends a command to the brake control unit 120 to operate the park brake hydraulic actuator (step 156). The brake control unit 120 sends a command to the park brake hydraulic actuator to supply the park brake with a force sufficient to hold the aircraft stationary (step 156). The hydraulic pressure in the park brake system begins to increase as does the force on the park brake piston (step 158). The flight crew then manually release the pedal brake input (step 160), but before the force on the park brake piston has reached the desired level. The pedal brake input is now thus commanding a reduced (zero) force on the pedal brake piston. In this example various other pre-set criteria are met, and as a result the brake control unit 120 overrides this reduced pedal braking command and continues to operate the pedal brake hydraulic actuator to provide force to the pedal brake piston (step 162)—being the same force as previously applied (in alternative embodiments the force applied can be a pre-set pedal braking force, which is higher than actually commanded by the brake pedal(s) but can be different from the force applied immediately before the brake pedal is released). The automatically applied pedal brake force holds the aircraft stationary (step 164). After a period of time the park brake force provided by the park brake piston reaches a level that is sufficient to hold the aircraft stationary (step 166). The brake control unit 120 receives a signal from the park brake force sensor that the park brake force has reached a sufficient level (step 168) and the brake control unit 120 ceases to override the command to reduce the force on the pedal brake piston to a minimum (170). The brake control unit 120 then operates the pedal brake hydraulic actuator to reduce the force provided by the pedal brake piston to a minimum. In an alternative example operation, rather than the brake control unit 120 ceasing to override the reduced pedal braking on the basis of the park brake force having reached a certain level, the brake control unit 120 ceases to override the reduced pedal braking after ten seconds. The parts of the process performed by the brake control unit may for example be implemented, at least in part, in software.

Figure 7:
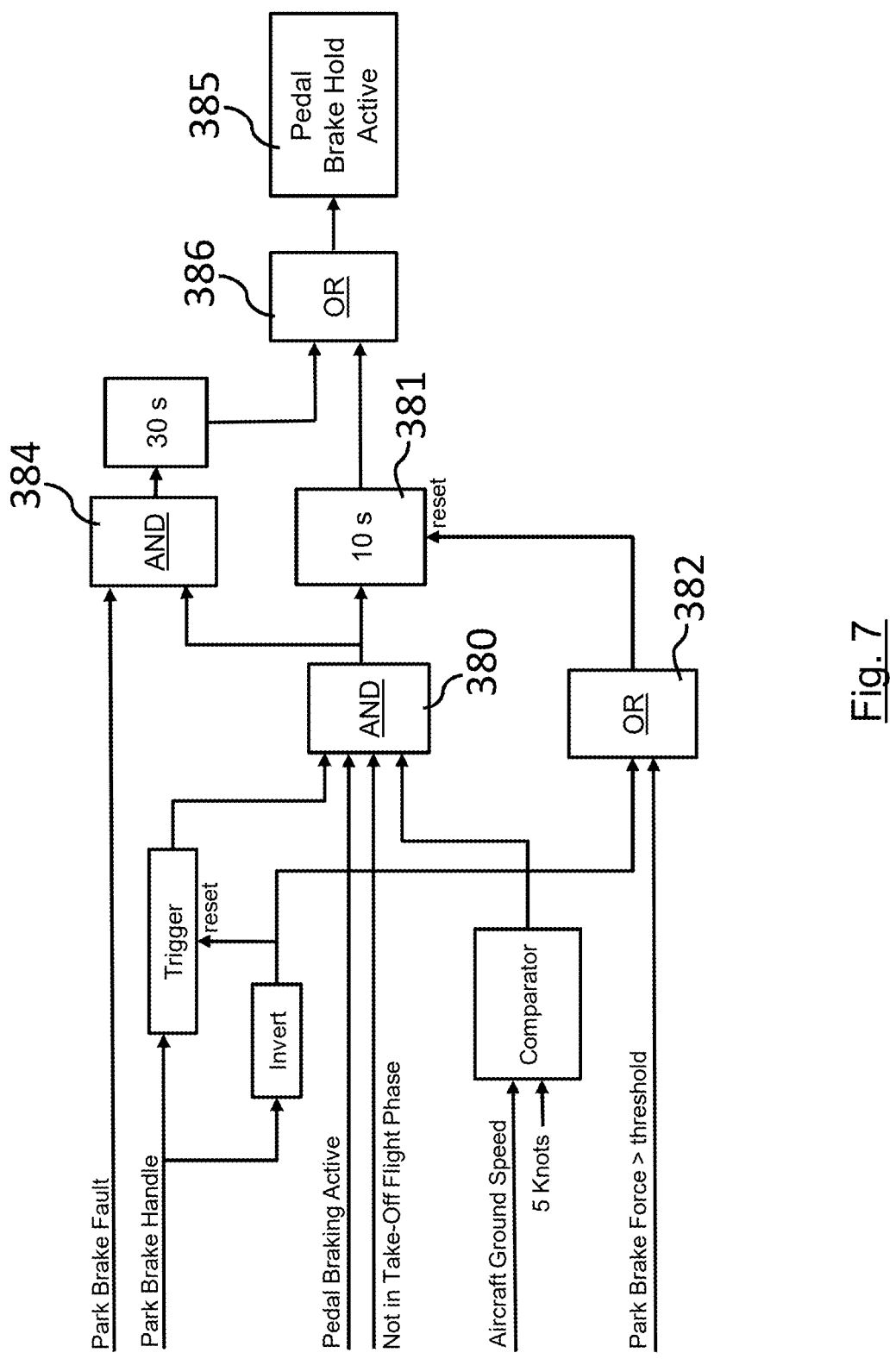
FIG. 7 is a logic diagram which shows the function of an electronic control unit configured to carry out a pedal brake hold function according to a second embodiment of the invention.

FIG. 7 is a logic diagram which shows the function of an electronic control unit configured to carry out a pedal brake hold function in conjunction with the aircraft's existing brake control system according to a second embodiment of the invention. Thus, the second embodiment is similar to the first embodiment, but the control unit can be considered as only having an impact on the aircraft braking when certain scenarios and conditions exist.

When the aircraft is stopped in response to pedal braking and then the park brake is applied, the pedal brake is automatically engaged in a pedal brake hold mode configuration, provided certain pre-set criteria are met. In the pedal brake hold mode, the electronic control unit can override a manual command from the brake pedals to reduce the force on the pedal brake piston and thus causes the pedal brake actuator to apply pedal brake force to the wheels of the aircraft, despite a lower or zero pedal braking command manually provided by flight crew. In this second embodiment, a pedal brake hold mode is triggered if various initial conditions are met, namely that manual pedal braking is active, the aircraft is not in take-off mode, the park brake handle is activated (moved from "off" position to "on" position) and the speed of the aircraft is less than 5 knots. These pre-set conditions are each shown leading to an AND logic gate 380 which indicates that all of these condition are required in order for the pedal brake hold mode to be activated. The output of the AND gate 380 triggers a 10 second period (box 381) during which the pedal brake force is automatically maintained at a level to hold the aircraft stationary (represented by box 385 ("pedal brake hold active").

If the park brake handle is deactivated (turned off), or if the park brake pressure is greater than a certain threshold value during the 10 second time period, then the trigger is reset and the pedal brake hold mode is disabled. These conditions are shown leading to the OR logic gate 382. If during the 10 second time period, a fault is detected in the park brake system then a 30 second time period will begin in which the pedal brake hold mode is held active. This is achieved by in the logic diagram by testing the conditions which are shown leading to the AND logic gate 384. It will be seen that the OR logic gate 386 operates such that if either the 10 second or the 30 second time period is triggered then the pedal brake hold mode is maintained active.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the second embodiment (although not shown in FIG. 7), the pedal brake hold mode may be deactivated if either the aircraft ground speed is detected as being >5 knots or if the aircraft is in take-off mode. For example, in FIG. 7 a second independent output from the 'Comparator' function block could be added and connected as a third input to the OR gate 382 to enable the 10 second timer 381 to be reset in the event that the aircraft ground speed exceeds 5 knots. Also the "Not in Take-Off Flight Phase" input to the AND gate 380 could be inverted and then used as a fourth input to the OR gate 382. This would enable the timer 381 to be reset in the event of the aircraft being switched to Take-Off Flight Phase.

The embodiments could be adapted for use with aircraft such as a helicopter or military aircraft.

The control system may be retrofitted to an aircraft that has a brake systems preinstalled. In certain aircraft, such retrofitting might be achievable by means of a software/computer upgrade.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. An electronic control device for use when effecting braking of wheels of an aircraft, the aircraft comprising a first brake system for braking one or more of the wheels, the first brake system having a first input device which is manually controllable by flight crew to generate a braking command which causes a braking force to be applied that can be different values across a range of braking forces allowing an amount of braking applied to the one or more wheels to be varied under manual control of the first input device from zero to full braking, and a second brake system for braking one or more of the wheels, the second brake system having a second input device which is manually controllable by flight crew to activate an aircraft parking mode in which a braking force sufficient to hold the aircraft stationary in a parked state is applied to one or more wheel brakes, and which is manually controllable by flight crew to de-activate the aircraft parking mode so that the braking force is reduced to a level at which the aircraft is released from such a parked state, the electronic control device being configured to monitor the braking command demanded by the first brake system and/or a level of braking actually applied by the first brake system, monitor the braking command demanded by the second brake system and/or a level of braking actually applied by the second brake system, apply, in an event that certain first pre-set criteria are met, a higher level of braking by the first brake system than would otherwise be applied, and cease to apply, in the event that certain second pre-set criteria are met, said higher level of braking by the first brake system, the first pre-set criteria including both the flight crew activating the aircraft parking mode with the use of the second input device, and there being a premature reduction in the braking command demanded by the first brake system and/or in the level of braking actually applied by the first brake system, and the second pre-set criteria including whether the aircraft parking mode is demanded by the second input device active, and whether it can be concluded that a braking force sufficient to hold the aircraft stationary in the parked state is being applied to one or more wheel brakes, wherein the electronic device automatically intervenes, following release of the first input device by flight crew, to cause a braking force to continue to be applied by the first brake system until one or more conditions are met from which it can be deduced that sufficient braking force is being applied by the second brake system to hold the aircraft stationary.

2. The electronic control device according to claim 1, wherein the control device receives an input from which the control device can determine whether a park brake has been activated by flight crew.

3. The electronic control device according to claim 1, wherein the control device receives an input from which the control device can determine whether pedal braking is active.

4. The electronic control device according to claim 1, wherein the control device receives an input from which the control device can determine aircraft ground speed or whether the aircraft ground speed meets certain speed criteria.

5. The electronic control device according to claim 1, wherein the control device receives an input from a braking force sensor which detects the brake pressure or brake force applied by one of the brake systems of the aircraft.

6. The electronic control device according to claim 1, wherein the control device receives an input from which the control device can determine whether a parking brake fault exists.

7. The electronic control device according to claim 1, wherein the control device uses a clock signal to ascertain whether a certain amount of time has elapsed from the time when the flight crew last activated the aircraft parking mode with the use of the second input device.

8. The electronic control device according to claim 1, wherein the aircraft is a commercial fixed-wing passenger aircraft configured to carry at least 50 passengers.

9. A computer program product comprising instructions which, when the program is executed by a programmable control device, cause the control device to carry out a function of the electronic control device of claim 1.

10. A method of operating an aircraft, the aircraft comprising a first brake system for one or more wheels of the aircraft, the first brake system having a first input device which is manually controllable to generate a braking command which causes a braking force to be applied that can be different values across a range of braking forces allowing an amount of braking applied to the one or more wheels to be varied under manual control of the first input device from zero to full braking, a second brake system for one or more wheels of the aircraft, the second brake system having a second input device which is manually controllable to activate an aircraft parking mode in which a braking force sufficient to hold the aircraft stationary in a parked state is applied to one or more wheel brakes, and which is manually controllable to de-activate the aircraft parking mode so that the braking force is reduced to a level at which the aircraft is released from such a parked state, the method comprising steps of manually using the first input device to command an application of braking to one or more wheels of the aircraft by the first brake system when the aircraft is in a state ready to be parked and/or to slow the aircraft to such a state, manually using the second input device to activate the aircraft parking mode, while the first input device continues to be manually used to command the application of braking, after the aircraft parking mode has been activated, manually using the first input device to generate a lower or zero braking command, an electronic control device overriding the lower braking command, if certain first pre-set criteria are met, so that the braking force applied by the first braking system is higher than so commanded, wherein the electronic device automatically intervenes, following release of the first input device by flight crew, to cause a braking force to continue to be applied by the first brake system until one or more conditions are met from which it can be deduced that sufficient braking force is being applied by the second brake system to hold the aircraft stationary, and holding the aircraft in a parked state with use of the second braking system.

11. The method according to claim 10, wherein
the first brake system is a pedal brake system, and
the first input device is a pedal brake.

12. The method according to claim 10, wherein the method includes a step of the electronic control device ceasing, if certain second pre-set criteria are met, its overriding of the braking command, if any, from the first input device.

13. The method according to claim 12, wherein the second pre-set criteria used by the electronic control device include whether a time period has elapsed, the time period being determined by a pre-set delay after the time at which the second input device is used to activate the aircraft parking mode.

14. The method according to claim 12, wherein the second pre-set criteria used by the electronic control device include the level of braking commanded by the second brake system.

15. The method according to claim 12, wherein the second pre-set criteria used by the electronic control device include the level of braking force being applied under the command of the second brake system.

16. The method according to claim 10, wherein the first pre-set criteria used by the electronic control device include a speed of the aircraft and/or whether the aircraft is in take-off mode.

17. The method according to claim 10, wherein the first pre-set criteria used by the electronic control device include whether a park brake system fault is detected.

18. The method according to claim 10, wherein the first pre-set criteria are such that the electronic control device initially overrides the lower braking command if the electronic control device determines, in view of one or more input signal(s) received at the electronic control device, that the aircraft is not in take-off mode, and the aircraft is not moving at a speed of more than a threshold speed, the threshold speed being less than 15 knots, and wherein the electronic control device continues to override the lower braking command for at least five seconds after a time at which the second input device is used to activate the aircraft parking mode, unless the electronic control device determines in view of one or more input signal(s) received at the electronic control device that the second input device has been used to deactivate the aircraft parking mode for a time longer than a threshold time, the threshold time being less than 5 seconds, or the level of braking force being applied under the command of the second brake system is higher than a pre-set threshold.

19. The method according to claim 10, being performed as part of a method of parking an aircraft, wherein the step of manually using the first input device is performed by flight crew pressing one or more brake pedals to cause brake force to be applied to the brakes of one or more wheels of the aircraft when the aircraft is ready to be parked, the step of manually using the second input device is performed by flight crew activating a parking brake device, the step of manually using the first input device to generate a lower or zero braking command, after the aircraft parking mode has been activated, is performed by flight crew then releasing the one or more brake pedals.

20. A computer program product comprising instructions which, when the program is executed by a programmable control device, cause the control device to carry out a function of the electronic control device of the method of claim 10.

* * * * *